July 25, 1972   C. C. HARDMAN   3,679,482
IRON ELECTRODE

Filed Feb. 5, 1971   2 Sheets-Sheet 1

WITNESSES:

INVENTOR
Carl C. Hardman
BY
ATTORNEY

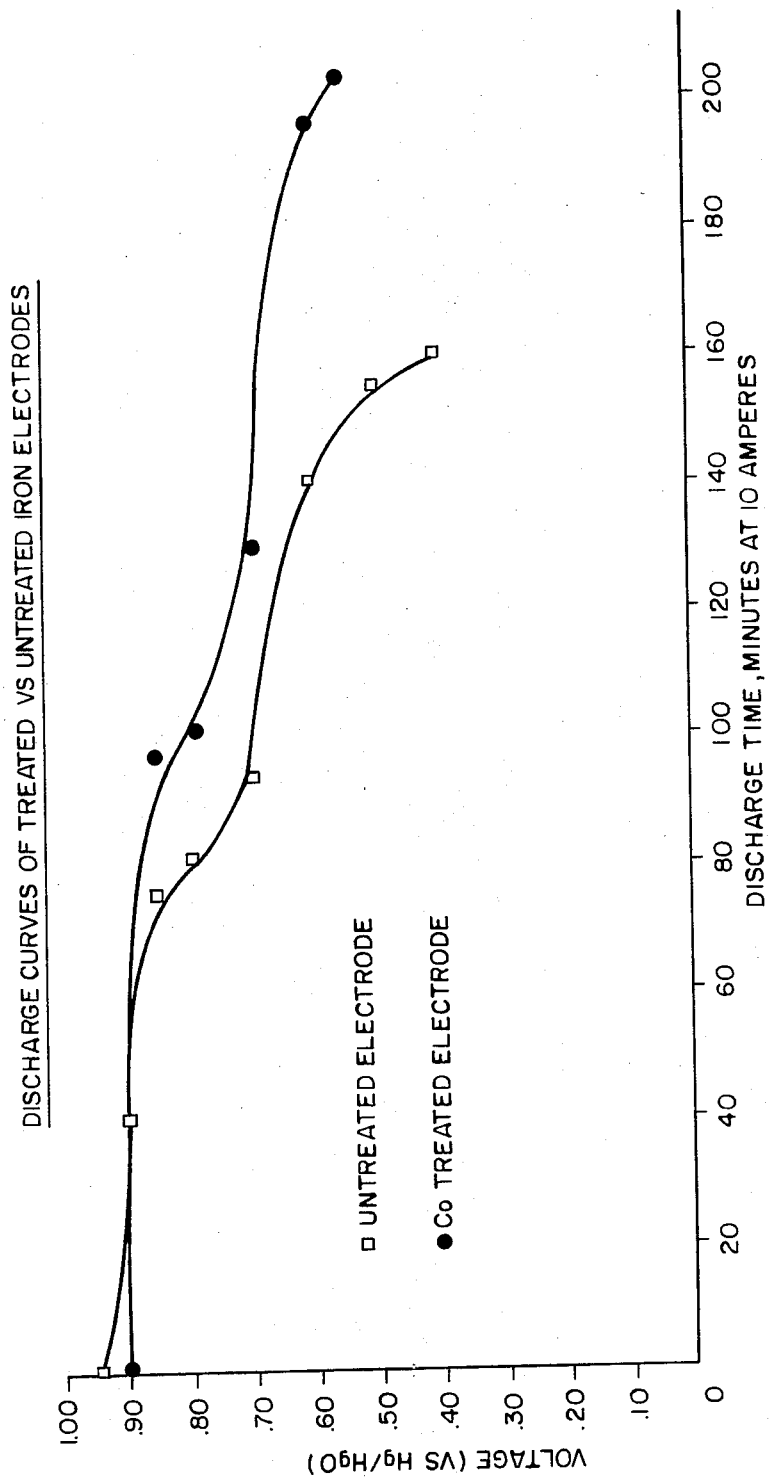

3,679,482
IRON ELECTRODE
Carl C. Hardman, Pittsburgh, Pa., assignor to Westinghouse Electric Corporation, Pittsburgh, Pa.
Filed Feb. 5, 1971, Ser. No. 112,974
Int. Cl. H01m 43/04
U.S. Cl. 136—25
4 Claims

ABSTRACT OF THE DISCLOSURE

A negative electrode plate, for a battery containing at least one positive and one negative electrode plate, with electrolyte contacting the plates, is made by depositing a soluble cobalt salt in a sulfur activated iron negative electrode plate and reacting the deposit with alkali hydroxide.

BACKGROUND OF THE INVENTION

This invention relates to improving the performance of the negative electrode of an iron-nickel or iron-air battery by treating sulfur activated iron electrodes with cobalt. More particularly, this invention relates to the addition of water soluble cobalt salt to iron particles, activated by fusion coating with elemental sulfur, selenium or tellurium at elevated temperatures, to provide improved battery active material and electrode plates.

Certain parameters are fixed in battery cell design, such as grams of iron oxide that can be loaded per cubic centimeter of electrode volume. This limits the volumetric efficiency of the cell. Therefore, any means of increasing the number of ampere-hours storage in a gram of iron oxide would be highly desirable. Another serious problem in battery design has been retention of active material within a negative plate throughout battery life.

The iron battery electrode plate is composed of a finely divided iron powder, deposited or impregnated in a supporting plaque and compacted to a desired density. When pure iron oxide powder is used as an electrode active material in an alkali electrolyte, a battery has limited utilization due to the rapid formation of a passivating film on the iron surface.

To promote the charging of the compacted powder as well as to facilitate the discharging of the electrode plate, a reaction promoting additive for the electrode active material is needed. Such an additive should have the ability to activate the entire substance, though present in relatively small amounts.

Although the addition of elemental sulfur as an additive to iron oxide powder in a negative iron electrode is known in the art, as shown in U.S. Pat. 3,507,696 to Jackovitz, there is a need for other compounds that can further activate sulfurized iron oxide in negative electrodes and help to retain the active material within the electrode plate during battery use.

SUMMARY OF THE INVENTION

I have found that depositing cobalt nitrate in a sulfur fuse coated iron oxide battery plate, and subsequent cobalt precipitation in an alkaline bath provides a negative battery plate superior to a plate made without the cobalt, both in ampere-hours capacity and watt-hours of stored energy.

BRIEF DESCRIPTION OF THE DRAWING

For a better understanding of the invention, reference may be made to the accompanying drawings in which:

FIG. 3 is a graph showing the discharge curves of cobalt treated versus untreated negative electrodes.

DESCRIPTION OF THE PREFERRED EMBODIMENTS

One embodiment of a battery, utilizing the improved electrode plate of my invention, would generally comprise a plurality of alternate negative iron plates and positive plates such as, for example, loaded nickel plates, with plate separators between the positive and negative plates, all contacted by alkaline electrolyte and housed in a case having a cover, a vent, and positive and negative terminals.

Figure 1:
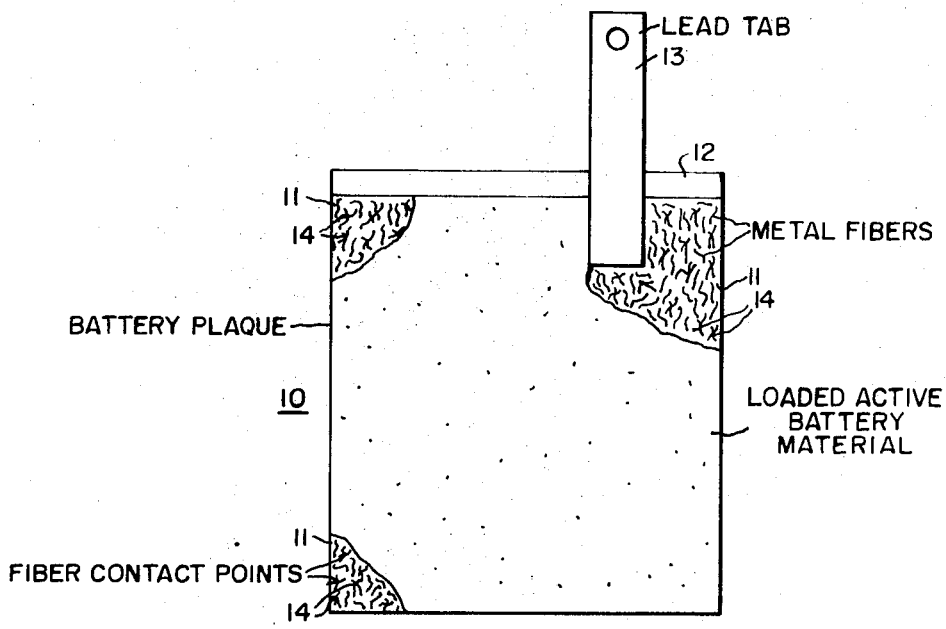
FIG. 1 shows an electrode plaque loaded with the active battery material of this invention.

Preferred electrode plaques, shown in FIG. 1, are made from metal fibers, preferably nickel, or metal coated fibers, such as nickel coated steel or iron. The plaque 10, is a flexible, expansible, compacted sheet of relatively smooth, generally contacting, intermingled, metal fibers as shown at 11 in the body of the plaque. The plaque has, in the embodiment shown, top edge 12 coined to a high density. The coined area provides a base to which lead tab 13, which is attached to the battery terminals, is spot welded. The plaque porosity is preferably between 75 and 95 percent porous i.e., having a plaque density between 5 and 25 percent of theoretical density. Activated iron electrode material is loaded into the interstices of the body of this fibrous plaque to provide an electrode plate. This invention can, however, be used with other plaque structures.

The metal fibers are preferably diffusion bonded in a protective atmosphere at temperatures up to the melting point of the fibers used. In diffusion bonding, the fibers must not be melted, or protuberances will be formed reducing active material loading (volume) within the plaque. There should only be a metallurgical bond and interdiffusion of atoms across the fiber interface at fiber contact points 14 along the fiber lengths. Diffusion bonding provides a flexible, expansible electrode structure having a large pore volume into which active material can be pasted or otherwise impregnated. Diffusion bonding also lowers the electrode plate resistance appreciably and thus the internal cell resistance in a finished cell.

The body of active material can be prepared by reacting iron oxide particles with sulfur of about 99 percent purity, in the form of elementary flowers of sulfur, colloidal sulfur, or as pure sulfur particles obtained by evaporation of a solution containing molecular sulfur. The sulfur additive is dry mixed with the iron component particles followed by fusion of the components, in a container with a lid allowing gas leakage, at 100° C. to 150°

C. High purity selenium and tellurium can also be used as the additive in this invention and coating will be dependent on the fusion temperature range of these elemental additives. The additive should be present in the range of about 5–20 percent of the weight of the iron particles. This fusion process does not involve a chemical reaction between the additive and oxide but a more simple physical process whereby the irregular surface of the iron oxide particles is fuse coated with the elemental sulfur, selenium or tellurium additive.

In the case of sulfur, if the temperature is kept below the melting range of sulfur (less than about 100° C.), then fusion will not occur. The temperature range for fusion of sulfur is from about 100° C. to 150° C. At its melting range (110° C. to 116° C.) and a little above, sulfur is liquid, transparent and mobile. A transparent coating is thus formed on a surface of the oxide particles. If the temperature of fusion exceeds 150° C. the liquid sulfur turns dark brown and becomes increasingly viscous as the temperature is further raised causing serious complications which cause poor electrochemical utilization of the active material.

The iron particles are finely divided powders having an average particle size range from about 0.2 to 74 microns. The active particles include at least one oxide of iron or iron oxide hydrate and the additive. The iron particle component can include, for example, ferrous oxide (FeO), ferric oxide ($Fe_2O_3$), ferroso-ferric oxide ($FeO \cdot Fe_2O_3$ or $Fe_3O_4$), hydrated ferric oxide $$(Fe_2O_3 \cdot H_2O)$$

and mixtures thereof.

Suitable commercial iron oxide compounds include Mapico Black (from Columbian Carbon Company) containing approximately 99% $Fe_3O_4$ (22% Fe+77% $Fe_2O_3$) and Meramec 25 (from St. Joseph Lead Company) containing approximately 94% $Fe_3O_4$ and 5% $Fe_2O_3$ with $SiO_2$, $Ca_2O$, $Al_2O_3$ and MgO impurities.

The sulfurized fusion coated iron particle component is generally loaded into the porous fiber metal plaques by aqueous slurry impregnation and treated with cobalt nitrate. The deposited cobalt nitrate in the plate is subsequently reacted with alkali hydroxide by immersion in an alkaline bath to precipitate cobalt hydroxide within the plate.

The soluble cobalt salt that can be used to treat the sulfur activated iron negative electrode plates is $Co(NO_3)_2$. Cobalt salt concentrations of 0.03 to 0.2 molar (1 wt. percent to 7 wt. percent cobalt salt in water) are effective, with somewhat better results at the higher concentrations.

The effective weight range of Co to Fe in the treated electrode plate (Co/Fe wt. ratio) is between about 0.0007 to about 0.0052 (0.07 to 0.52 percent of the weight of the iron) with an optimum Co/Fe weight ratio between 0.0035 and 0.0045. Weight ratios over 0.0052 impart no additional benefit to the electrode but Co/Fe weight ratios up to about 0.01 (1 percent of the weight of the iron) can be used.

Generally the cobalt nitrate is deposited in the sulfur activated iron negative electrode plates by a room temperature dipping process. After the aqueous cobalt nitrate solution contacts the sulfur activated iron particles the electrode plate is allowed to dry for 1 to 3 hours. It is important that the sulfur activator be in elemental form as alternate activations that leave sulfur in anionic form are deactivated by cobalt addition as the slight acidity of the cobalt nitrate solution converts sulfide to $H_2S$, which evolves.

After drying, the electrode plate containing cobalt nitrate deposited through the sulfur activated iron particles is contacted by alkaline hydroxide, generally by dipping at room temperature in aqueous KOH or NaOH solutions containing between about 10 to 50 weight percent alkaline hydroxide. This step precipitates the cobalt nitrate to cobalt hydroxide, $Co(OH)_2$, and releases the nitrate from the electrode plate.

EXAMPLE 1

Two 6" x 10" x 0.35" diffusion bonded expansible, flexible nickel fiber electrode plaques, about 85% porous and weighing about 37 gr. each, were loaded with an aqueous slurry of sulfurized iron particles.

The iron particles had an average particle size of about 44 microns (325 mesh) and a composition of about 99% $Fe_3O_4$ (sold under the trade name Mapico Black by Columbian Carbon Company). The iron particles were dry blended with about 8 weight percent flowers of sulfur. This mix was then placed in a Teflon-lined stainless steel reaction vessel, having a top that was only finger tight to allow escape of gas. The reaction vessel was placed in a preheated oven at 120° C. for 20 hours, removed and allowed to cool before opening. This provided the iron particles with an unreacted, elemental sulfur fuse coating substantially covering their active surface.

The two electrode plates contained about 57 gr. of sulfurized iron oxide each (about 53 gr. $Fe_3O_4$ or 39 gr. Fe). One electrode plate was immersed in a room temperature (25° C.) 5 weight percent aqueous solution of $Co(NO_3)_2 \cdot 6H_2O$ and allowed to soak for 1 hour. It was then removed from the solution and dried in air for 1½ hours. Then it was immersed in a room temperature (25° C.) 25 weight percent aqueous solution of KOH to precipitate the deposited Co ion as $Co(OH)_2$. The electrode plate retained approximately about 17 $cm^3$ or 1 gr. of $Co(NO_3)_2 \cdot 6H_2O$ solution. This provided 0.17 gr. Co in the plate, or a Co/Fe weight ratio of 0.17/39=0.004.

The treated electrode plate was removed from the alkali solution and dried. Both electrodes were placed in a test cell made up of an iron electrode plate, two Ni dummy sheets for counter electrodes and 25 weight percent KOH as electrolyte. Spacers were used to prevent short circuits. The testing was done in a conventional manner, i.e. the cells were charged (65 ma./$cm^2$) and discharged (25 ma./$cm^2$) through a power supply, while the single electrode potential of the iron electrode was monitored by an Hg/HgO reference electrode. An electrometer was used so as not to polarize the reference electrode. The time required at constant current for the iron electrode to reach cut-off potential while being oxidized (discharged) was used as the capacity of the electrode.

The cobalt treated negative electrode gave about 0.50 a.h./gr. of active material loaded on its third discharge and, subsequently, rose to a level of consistently yielding about 0.58 a.h./gr. of active material. In contrast the untreated negative electrode gave about 0.42 a.h./gr. of active material loaded on its third discharge and never gave above 0.50 a.h./gr. of active material or 0.31 a.h./gr. of total plate.

Figure 2:
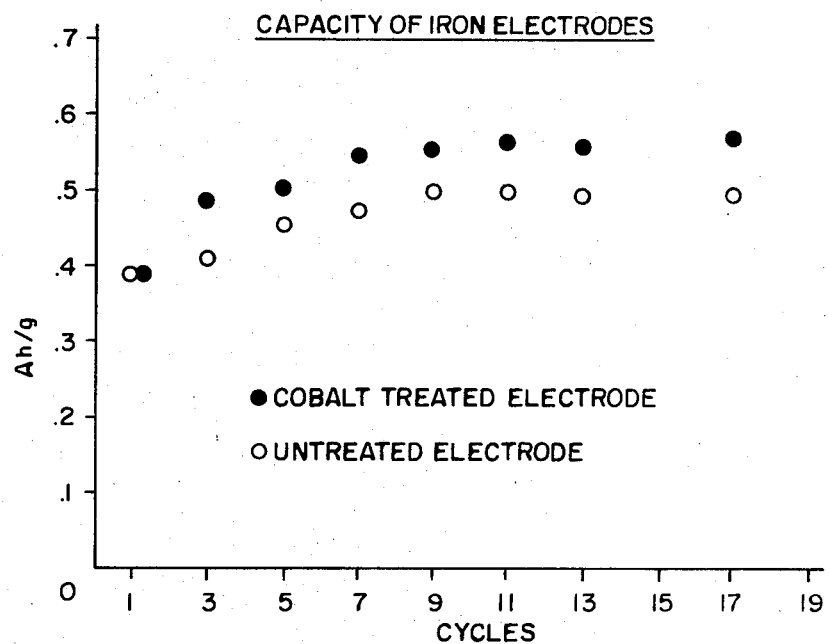
FIG. 2 is a graph showing the increase in capacity of cobalt treated negative electrodes over untreated negative electrodes.

Comparative results are shown in FIG. 2 of the drawings. Other cobalt treated negative electrodes have provided about 0.65 a.h./gr. of active material after about 20 cycles, corresponding to 0.39 a.h./gr. of total plate, i.e. active material plus current collector. Comparative discharge curves are shown in FIG. 3. The curves were graphically integrated to show the cobalt treated electrode gave about 12.8 w.h. above the cutoff potential of 0.4 v. (Hg/HgO scale) compared to about 9.8 w.h. for the untreated electrode on discharge, both at 10 amps. These results show improvements of about 20% (a.h.) and 30% (w.h.) at the nominal 2 hour drain rate. In addition, the cobalt treated active battery material seemed less inclined to flaking from the electrode plate during handling and cell operation.

I claim:

1. An electrode plate comprising a supporting plaque loaded with electrode material comprising iron particles selected from the group consisting of iron oxide, iron oxide hydrate, and mixtures thereof having a fused coating of additive thereon, said additive being selected from the group consisting of elemental sulfur, selenium, and tellurium, said additive being present in the range of about 5–20 percent of the weight of the iron particles, and cobalt hydroxide in an amount effective to improve the capacity of the electrode.

2. The electrode plate of claim 1 wherein the plaque is between 75 and 95 percent porous and comprises diffusion bonded metallic fibers.

3. The electrode plate of claim 2 wherein the element coating the iron particles is sulfur, and wherein the weight ratio of cobalt/iron is up to about 0.01.

4. The electrode plate of claim 2 wherein the weight ratio of cobalt/iron is between about 0.0007 and 0.0052.

References Cited
UNITED STATES PATENTS

| | | | |
|---|---|---|---|
| 1,761,740 | 6/1930 | Nordlander | 106—70 |
| 1,826,724 | 10/1931 | Booss et al. | 136—154 |
| 2,737,541 | 3/1956 | Coolidge | 136—25 |
| 2,841,632 | 7/1958 | Macholl et al. | 136—154 |
| 2,871,281 | 1/1959 | Moulton et al. | 136—25 |
| 3,066,178 | 11/1962 | Winkler | 136—25 |
| 3,507,696 | 4/1970 | Jackovitz et al. | 136—25 |

WINSTON A. DOUGLAS, Primary Examiner

C. F. LEFEVOUR, Assistant Examiner

U.S. Cl. X.R.

106—70